United States Patent
Kobayashi

(10) Patent No.: US 8,083,015 B2
(45) Date of Patent: Dec. 27, 2011

(54) HYBRID VEHICLE

(75) Inventor: Tomohiro Kobayashi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 555 days.

(21) Appl. No.: 12/295,719

(22) PCT Filed: Oct. 3, 2006

(86) PCT No.: PCT/JP2006/319750
§ 371 (c)(1),
(2), (4) Date: Oct. 1, 2008

(87) PCT Pub. No.: WO2008/041319
PCT Pub. Date: Apr. 10, 2008

(65) Prior Publication Data
US 2009/0044995 A1    Feb. 19, 2009

(51) Int. Cl.
*B60K 6/20* (2007.10)

(52) U.S. Cl. ..................... 180/65.21; 701/22

(58) Field of Classification Search .... 180/65.21–65.31; 701/22
See application file for complete search history.

(56) References Cited

U.S. PATENT DOCUMENTS

| | | | |
|---|---|---|---|
| 5,832,396 A * | 11/1998 | Moroto et al. | 701/22 |
| 5,973,460 A * | 10/1999 | Taga et al. | 318/139 |
| 6,166,449 A | 12/2000 | Takaoka et al. | |
| 6,230,496 B1 * | 5/2001 | Hofmann et al. | 60/706 |
| 6,282,496 B1 * | 8/2001 | Chowdhary | 701/220 |
| 6,502,652 B2 * | 1/2003 | Rogg | 180/65.21 |
| 6,507,127 B1 * | 1/2003 | Amano et al. | 290/40 C |
| 6,580,188 B2 * | 6/2003 | Katagiri et al. | 310/67 A |
| 6,636,787 B2 * | 10/2003 | Yamaguchi et al. | 701/22 |
| 7,848,858 B2 * | 12/2010 | Tabata et al. | 701/22 |
| 2002/0107618 A1 * | 8/2002 | Deguchi et al. | 701/22 |
| 2004/0238244 A1 | 12/2004 | Amanuma et al. | |
| 2010/0286909 A1 * | 11/2010 | Tate et al. | 701/209 |

FOREIGN PATENT DOCUMENTS

DE    19831487 C1    3/2000
(Continued)

OTHER PUBLICATIONS

An English Translation of the First Office Action dated Dec. 6, 2010, issued in the corresponding Chinese Patent Application No. 2006800537602.

(Continued)

*Primary Examiner* — Jeffrey J Restifo
*Assistant Examiner* — Emma K Frick
(74) *Attorney, Agent, or Firm* — Buchanan Ingersoll & Rooney PC

(57) ABSTRACT

A hybrid vehicle which can determine slope ascending and slope descending without using GPS radio waves. The hybrid vehicle includes a control unit determines a slope ascending state or a slope descending state of the vehicle by making use of an inclination sensor which detects an inclination with respect to a horizontal surface in the running direction of the vehicle or a vehicle drive sensor. Alternatively, the control unit obtains slope ascending information or slope descending information of the road by making use of a driver operation panel or a bus location system. The control unit sets a charge rate target value of an energy storage device based on these slope ascending state, slope ascending information, slope descending state, and slope descending information and controls charging to the energy storage device.

4 Claims, 13 Drawing Sheets

FOREIGN PATENT DOCUMENTS

| | | |
|---|---|---|
| EP | 0 829 389 A2 | 3/1998 |
| EP | 829389 A2 * | 3/1998 |
| EP | 1 340 645 A2 | 9/2003 |
| EP | 1 086 848 | 5/2005 |
| FR | 2811268 A1 | 1/2002 |
| JP | 8-126116 A | 5/1996 |
| JP | 11-008909 A | 1/1999 |
| JP | 11-103501 | 4/1999 |
| JP | 11-8909 A * | 12/1999 |
| JP | 2002-281604 A | 9/2002 |
| JP | 2002281604 A * | 9/2002 |
| JP | 2003-009310 A | 1/2003 |
| JP | 2004-166363 A | 6/2004 |
| JP | 2005-218178 A | 8/2005 |
| JP | 2006-180626 A | 7/2006 |

OTHER PUBLICATIONS

Form PCT/ISA/210 (International Search Resort) dated Oct. 31, 2006.

English translation of Office Action from Japanese Patent Office issued in Applicant's corresponding Japanese Patent Application No. 2008-537376 dated Aug. 31, 2010.

Extended Search Report from European Patent Office issued in Applicant's corresponding European Patent Application No. 06811098.0 dated Sep. 6, 2010.

* cited by examiner

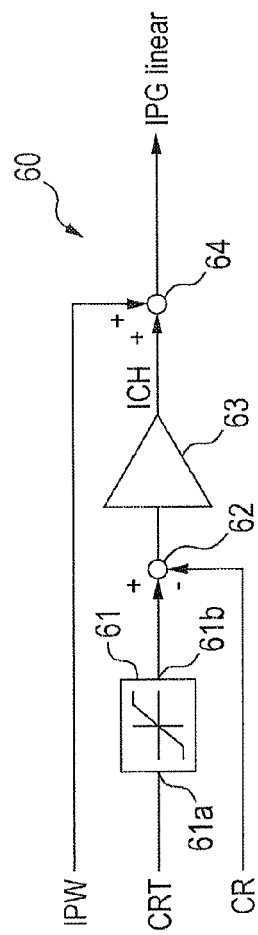
FIG. 6
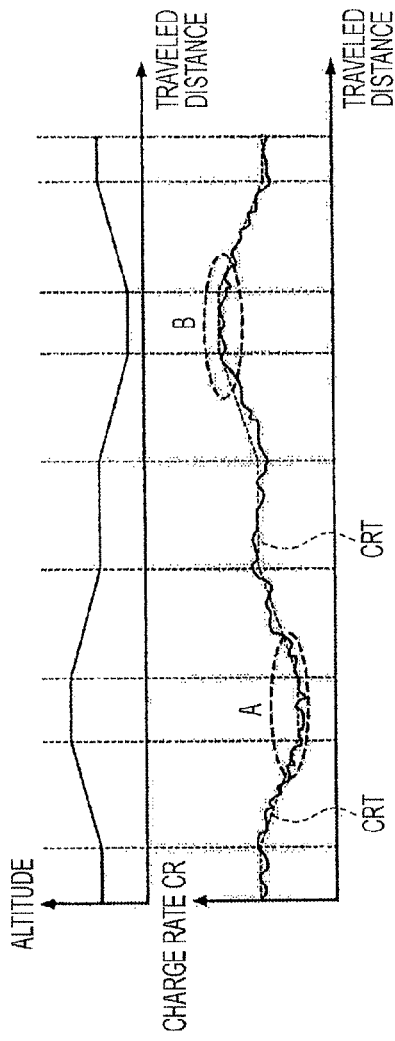
FIG. 7A
FIG. 7B

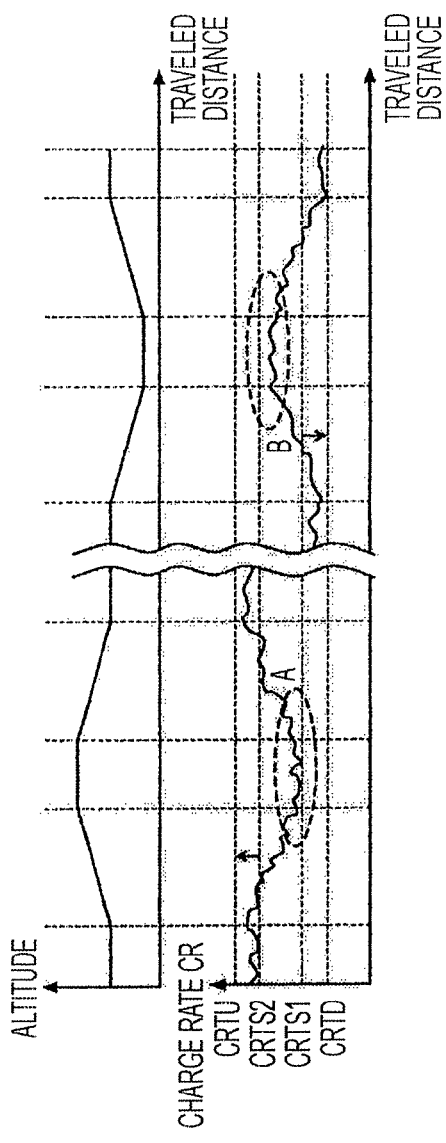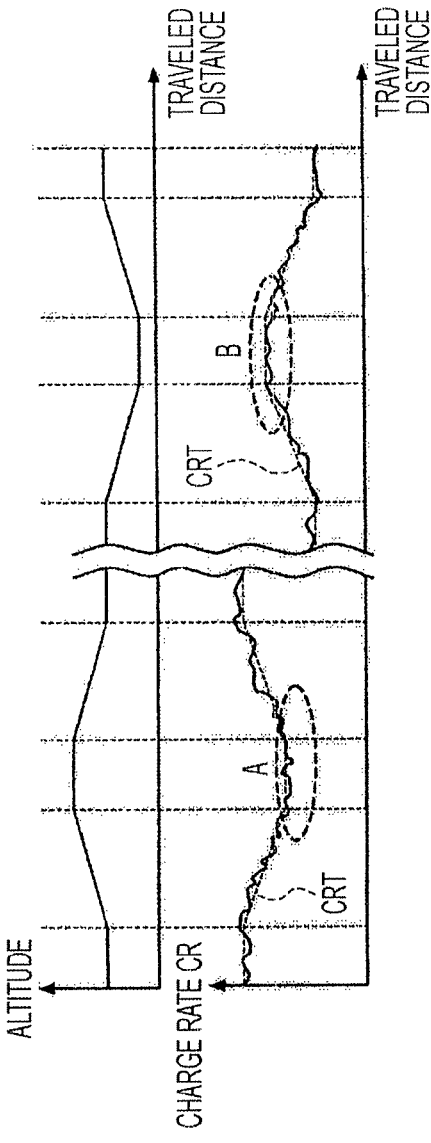
FIG. 12A
FIG. 12B
FIG. 13A
FIG. 13B

HYBRID VEHICLE

TECHNICAL FIELD

The present invention relates to a hybrid vehicle which is referred to as a series-type hybrid vehicle, and more specifically to a hybrid vehicle which includes an engine, a generator which is driven by the engine, an energy storage device and a drive motor which drives the vehicle, and is configured such that the drive motor drives the vehicle upon receiving a generation output of the generator and a charge output of the energy storage device and, further, the energy storage device is charged with the generation output of the generator and a regeneration output of the drive motor.

BACKGROUND ART

As a hybrid vehicle, there has been known a hybrid vehicle which is referred to as a parallel-type hybrid vehicle and a hybrid vehicle which is referred to as a series-type hybrid vehicle. The parallel-type hybrid vehicle is configured such that either one of the engine and the drive motor selectively drives a vehicle. In this parallel-type hybrid vehicle, the drive motor drives the vehicle upon receiving a storage output of an energy storage device and charges the energy storage device with a regeneration output of the drive motor. The series-type hybrid vehicle is configured such that the drive motor drives the vehicle. In the series-type hybrid vehicle, the engine does not directly drive the vehicle and drives the generator, and the drive motor drives the vehicle upon receiving the generation output of the generator and the storage output of the energy storage device, and the energy storage device is charged with the generation output of the generator and the regeneration output of the drive motor.

In JP-A-8-126116 (patent document 1), there is disclosed a parallel-type hybrid vehicle which can control the charging of an energy storage device (battery) corresponding to a traveling route of a vehicle. The parallel-type hybrid vehicle which is disclosed in the patent document 1 includes a navigation processing part which is connected to a GPS receiver, wherein slope ascending information and slope descending information in the traveling route of the vehicle is extracted by the navigation processing part, and the charging of the energy storage device is controlled based on the slope ascending information or the slope descending information.

Patent Document 1: JP-A-8-126116

DISCLOSURE OF THE INVENTION

Problems that the Invention is to Solve

However, the conventional hybrid vehicle disclosed in the patent document 1 measures a position of the vehicle by making use of GPS radio waves from an artificial satellite and hence, it is difficult to properly perform a charging control in a place where the GPS radio waves cannot be received such as a tunnel.

Accordingly, it is an object of the present invention to provide a series-type hybrid vehicle which can always perform a proper charging control without using GPS radio waves.

Means for Solving the Problems

A hybrid vehicle according to a first aspect of the present invention is a hybrid vehicle which includes an engine, a generator which is driven by the engine, an energy storage device, and a drive motor which drives a vehicle, and which is configured such that the drive motor drives the vehicle upon receiving a generation output of the generator and an energy storage output of the energy storage device and, further, the energy storage device is charged with the generation output of the generator and a regeneration output of the drive motor, wherein the hybrid vehicle includes a control unit which controls the generation output of the generator and controls the charging to the energy storage device, and an inclination sensor which detects an inclination in the running direction of the vehicle with respect to a horizontal surface, and the control unit includes a means which determines a slope ascending state and a slope descending state of the vehicle based on an inclination sensor output of the inclination sensor, and a means which sets a charge rate control target value with respect to the energy storage device based on the slope ascending state of the vehicle and the slope descending state of the vehicle.

A hybrid vehicle according to a second aspect of the present invention is a hybrid vehicle which includes an engine, a generator which is driven by the engine, an energy storage device, and a drive motor which drives a vehicle, and which is configured such that the drive motor drives the vehicle upon receiving a generation output of the generator and an energy storage output of the energy storage device and, further, the energy storage device is charged with the generation output of the generator and a regeneration output of the drive motor, wherein the hybrid vehicle includes a control unit which controls the generation output of the generator and controls the charging to the energy storage device, and a vehicle drive sensor which detects a driving condition of the vehicle, and the control unit includes a means which determines a slope ascending state and a slope descending state of the vehicle based on a drive sensor output of the vehicle drive sensor, and a means which sets a charge rate control target value with respect to the energy storage device based on the slope ascending state of the vehicle and the slope descending state of the vehicle.

A hybrid vehicle according to a third aspect of the present invention is a hybrid vehicle which includes an engine, a generator which is driven by the engine, an energy storage device, and a drive motor which drives a vehicle, and which is configured such that the drive motor drives the vehicle upon receiving a generation output of the generator and an energy storage output of the energy storage device and, further, the energy storage device is charged with the generation output of the generator and a regeneration output of the drive motor, wherein the hybrid vehicle includes a control unit which controls the generation output of the generator and controls the charging to the energy storage device, and a driver operation panel which inputs a traveling planed road of the vehicle, and the control unit includes a means which sets a charge rate control target value with respect to the energy storage device based on a slope ascending state and a slope descending state with respect to the traveling planed road.

A hybrid vehicle according to a fourth aspect of the present invention is a hybrid vehicle which includes an engine, a generator which is driven by the engine, an energy storage device, and a drive motor which drives a vehicle, and which is configured such that the drive motor drives the vehicle upon receiving a generation output of the generator and an energy storage output of the energy storage device and, further, the energy storage device is charged with the generation output of the generator and a regeneration output of the drive motor, and performs a route service with respect to a preset traveling route wherein the hybrid vehicle includes a control unit which controls the generation output of the generator and controls the charging to the energy storage device, a route information storage device which stores route information on respective service intervals of the traveling route, and an information acquisition device which acquires positional information from beacons arranged along the traveling route, and the control unit includes a means which reads the route information of the service interval in which the vehicle travels next based on the positional information and sets a charge rate control target value with respect to the energy storage device based on the route information.

ADVANTAGE OF THE INVENTION

The hybrid vehicle according to the first aspect of the present invention includes the control unit which controls the generation output of the generator and controls the charging to the energy storage device, and the inclination sensor which detects the inclination in the running direction of the vehicle with respect to the horizontal surface, and the control unit includes the means which determines the slope ascending state and the slope descending state of the vehicle based on the inclination sensor output of the inclination sensor, and the means which sets the charge rate control target value with respect to the energy storage device based on the slope ascending state of the vehicle and the slope descending state of the vehicle. Accordingly, even in a place where GPS radio waves cannot be received, it is possible to set the charge rate control target value to the energy storage device and to perform the control of the charge rate while always properly grasping the slope ascending state and the slope descending state of the vehicle.

The hybrid vehicle according to the second aspect of the present invention includes the control unit which controls the generation output of the generator and controls the charging to the energy storage device, and the vehicle drive sensor which detects the driving condition of the vehicle, and the control unit includes the means which determines the slope ascending state and the slope descending state of the vehicle based on the drive sensor output of the vehicle drive sensor, and the means which sets the charge rate control target value with respect to the energy storage device based on the slope ascending state of the vehicle and the slope descending state of the vehicle. Accordingly, even in a place where GPS radio waves cannot be received, it is possible to set the charge rate control target value to the energy storage device and to perform the control of the charge rate while always properly grasping the slope ascending state and the slope descending state of the vehicle.

The hybrid vehicle according to the third aspect of the present invention includes the control unit which controls the generation output of the generator and controls the charging to the energy storage device, and the driver operation panel which inputs the traveling planed road of the vehicle, and the control unit includes the means which sets the charge rate control target value with respect to the energy storage device based on the slope ascending state and the slope descending state with respect to the traveling planed road. Accordingly, even in a place where GPS radio waves cannot be received, it is possible to set the charge rate control target value to the energy storage device and to perform the control of the charge rate while always properly grasping the slope ascending information and the slope descending information of the traveling planed road.

The hybrid vehicle according to the fourth aspect of the present invention is the hybrid vehicle which performs the route service to the preset traveling route and includes the control unit which controls the generation output of the generator and controls the charging to the energy storage device, the route information storage device which stores route information on respective service intervals of the traveling route, and the information acquisition device which acquires positional information from the beacons arranged along the traveling route, and the control unit includes the means which reads the route information of the service interval in which the vehicle travels next based on the positional information and sets the charge rate control target value with respect to the energy storage device based on the route information. Accordingly, even in a place where GPS radio waves cannot be received, it is possible to set the charge rate control target value to the energy storage device and to perform the control of the charge rate while always properly grasping the slope ascending information and the slope descending information of the traveling planed road.

Other objects, features, viewpoints and advantageous effects of the present invention will become further apparent in view of the detailed explanation of the invention made hereinafter in conjunction with drawings.

BRIEF DESCRIPTION OF THE DRAWINGS

FIG. 6 is an electric circuit diagram showing a generation control circuit in the embodiment 2;

FIG. 7 is a characteristic chart showing a charge rate control characteristic according to the embodiment 2;

FIG. 12 is a characteristic chart showing a charge rate control characteristic according to the embodiment 4;

FIG. 13 is a characteristic chart showing a charge rate control characteristic according to the embodiment 4;

BEST MODE FOR CARRYING OUT THE INVENTION

Hereinafter, several embodiments of the present invention are explained in conjunction with drawings.

Embodiment 1

Figure 1:
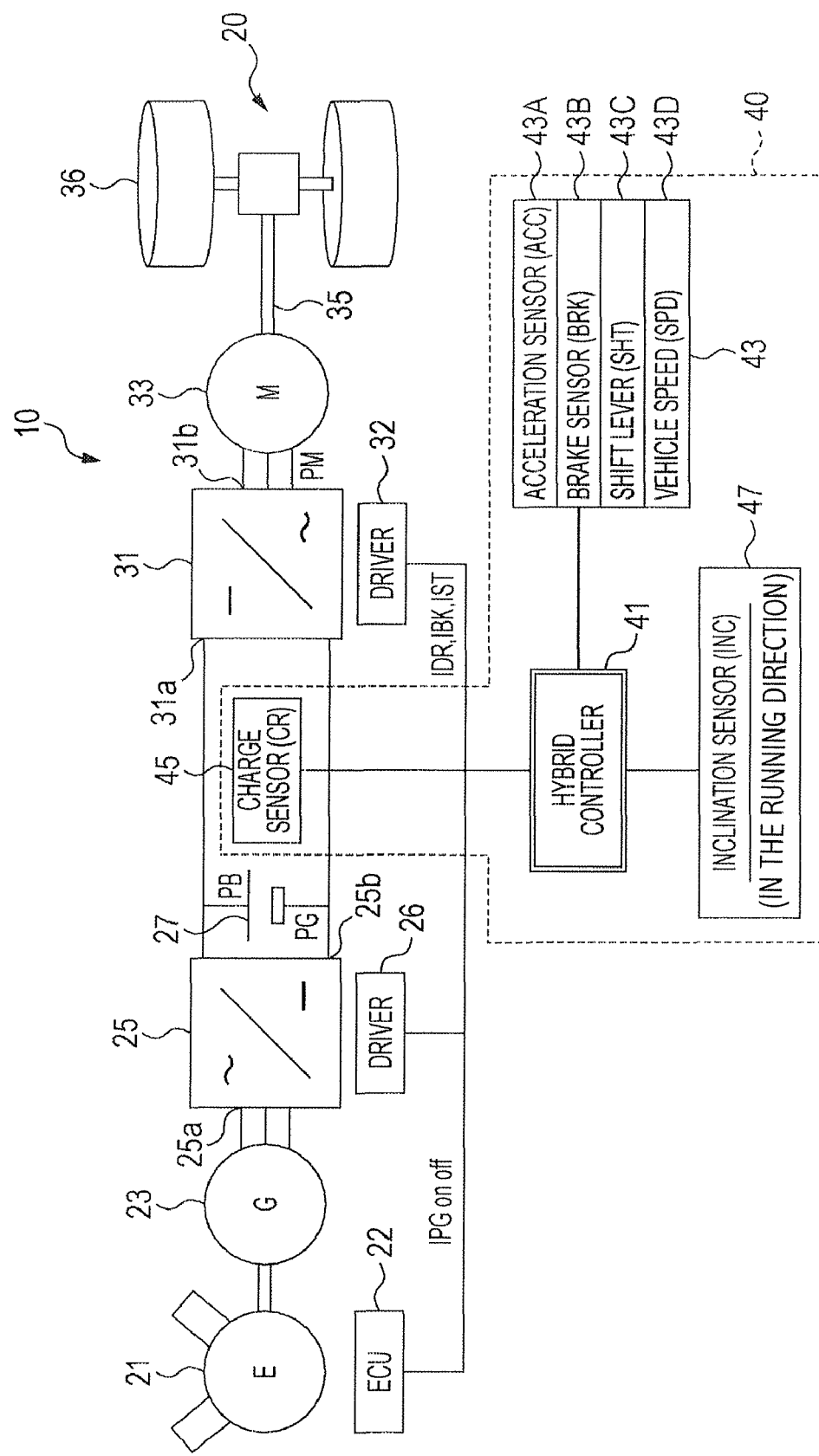
FIG. 1 is a constitutional view showing an embodiment 1 of a hybrid vehicle according to the present invention.

FIG. 1 is a constitutional view showing an embodiment 1 of a hybrid vehicle according to the present invention.

The hybrid vehicle 10 shown in FIG. 1 is a series-type hybrid vehicle. The hybrid vehicle 10 includes a driving system 20 and a control system 40. The driving system 20 includes an engine 21, an engine control unit (ECU) 22, a generator 23, a first power converter 25, a driver unit 26, an energy storage device 27, a second power converter 31, a driver unit 32, a drive motor 33, a drive shaft 35 and drive wheels 36.

The engine 21 is controlled by the engine control unit 22. The generator 23 is, for example, a three-phase AC generator. The generator 23 is directly connected to the engine 21 and generates a three-phase AC power. The first power converter 25 is, for example, a three-phase converter and is constituted of a plurality of semiconductor switches. The first power converter 25 is controlled by the driver 26 and converts the three-phase AC power of the generator 23 into a DC power. The first power converter 25 has the AC-side terminal 25a and a DC-side terminal 25b, wherein the first power converter 25 has the AC-side terminal 25a connected to the generator 23 and generates a generation output PG at the DC-side terminal 25b. The generation output PG is a DC power which is obtained by converting the three-phase AC power of the generator 23 into a DC power by the first power converter 25. The driver unit 26 controls the plurality of semiconductor switches of the first power converter 25 and performs a PWM-control of the first power converter 25, for example. It is possible that the generation output PG is adjusted with the PWM control of the first power converter 25.

The energy storage device 27 is, for example, a vehicle-mounted battery and generates a charge output PB. The energy storage device 27 is connected to the DC-side terminal 25b of the first power converter 25. The second power converter 31 has a DC-side terminal 31a and an AC-side terminal 31b. The DC-side terminal 31a of the second power converter 31 is connected to the DC-side terminal 25b of the first power converter 25 and the energy storage device 27. The AC-side terminal 31b of the second power converter 31 is connected to the drive motor 33. The drive motor 33 is, for example, a three-phase motor and connected to the drive shaft 35. The drive shaft 35 is connected to the drive wheels 36.

In a driving state such as start, acceleration or slope ascending of the hybrid vehicle 10, the drive motor 33 supplies a driving force to the drive wheels 36 by way of the drive shaft 35, in a coasting state, on the other hand, of the hybrid vehicle 10 such as deceleration or slope descending, the drive motor 33 is driven by the drive wheels 36 by way of the drive shaft 35 and generates a regeneration output PM. In the coasting state, the hybrid vehicle 10 travels without having the drive wheels 36 receiving a driving force from the drive motor 33, which is driven by the drive wheels 36 and generates the regeneration output PM. The regeneration output PM of the drive motor 33 is also a three-phase AC power.

The second power converter 31 performs a power conversion between the DC power and the three-phase AC power. The second power converter 31 is constituted of the plurality of semiconductor switches. The driver unit 32 controls the respective semiconductor switches of the second power converter 31 to control the power conversion between the DC power and the three-phase AC power. The driver unit 32 performs a PWM control of the second power converter 31.

The second power converter 31 has a first function of driving the drive motor 33 upon receiving the generation output PG of the first power converter 25 and the charge output PB of the energy storage device 27 and a second function of charging the energy storage device 27 using the regeneration output PM of the drive motor 33. In a driving state of the hybrid vehicle 10, the second power converter 31 converts, due to the first function, the generation output PG and the charge output PB into a three-phase AC power, and supplies this three-phase AC power to the drive motor 33 thus driving the drive motor 33. The driver unit 32, in the driving state of the hybrid vehicle 10, by performing a PWM control of the second power converter 31, both or either one of the AC voltage or frequency of the three-phase AC power outputted from the second power converter 31 are controlled thus adjusting the driving force of the drive motor 33.

In the coasting state of the hybrid vehicle 10, the second power converter 31 converts, due to the second function thereof, the regeneration output PM which the drive motor 33 generates, that is, the three-phase AC power into the DC current, and charges the energy storage device 27 with the DC power. By charging the energy storage device 27 with the regeneration output PM of the drive motor 33, it is possible to impart a braking force to the drive motor 33. The driver unit 32, in the coasting state of the hybrid vehicle 10, adjusts a braking force imparted to the drive motor 33 by performing the PWM control of the second power converter 31.

The control system 40 includes a control unit 41, a vehicle drive sensor 43, a charge sensor 45, and a vehicle inclination sensor 47. The control unit 41 is a hybrid controller and controls the engine control unit 22 and the driver units 26, 32 based on outputs of the vehicle drive sensor 43, the charge sensor 45, and the vehicle inclination sensor 47.

The vehicle drive sensor 43 includes an acceleration sensor 43A, a brake sensor 43B, a shift lever sensor 43C and a vehicle speed sensor 43D. The acceleration sensor 43A detects a step-in amount of an acceleration pedal which controls the acceleration and the deceleration of the hybrid vehicle 10, and outputs an acceleration sensor output ACC proportional to the step-in amount of the acceleration pedal. The control unit 41 generates a driving instruction IDR based on the acceleration sensor output, supplies the drive command IDR to the driver unit 32, and adjusts the driving force applied to the drive motor 33. For example, in performing the acceleration by increasing the step-in amount of the acceleration pedal, both or either one of the AC voltage and the frequency of the three-phase AC power which is outputted from the second power converter 31 is increased thus increasing the driving force of the drive motor 33. In performing the deceleration by decreasing the step-in amount of the acceleration pedal, the AC voltage or the frequency of the three-phase AC power is lowered thus decreasing the driving force of the drive motor 33.

The brake sensor 43B detects a step-in amount of the brake pedal in the hybrid vehicle 10 and outputs a brake sensor output BRK proportional to the step-in amount of the brake pedal. The control unit 41, when the brake pedal is stepped in, turns the three-phase AC power which is outputted from the second power converter 31 to zero so as to turn the driving force to the drive motor 33 to zero and, at the same time, performs a control such that the regeneration output PM which the drive motor 33 generates is converted to the DC power by the second power converter 31 and charges the energy storage device 27 with the regeneration output PM thus imparting a braking force to the drive motor 33. The control unit 41 generates the braking instruction IBK based on the braking sensor output BRK, supplies the braking instruction IBK to the driver unit 32 thus adjusting the braking force applied to the drive motor 33. For example, when the brake sensor output BRK is increased, the DC power of the second power converter 31 is increased so as to increase the braking force to the drive motor 33.

The shift lever sensor 43C detects the shift position of the gear shift lever in the hybrid vehicle 10 and outputs the shift sensor output SHT. The gear shift lever of the hybrid vehicle 10 includes, for example, three shift positions consisting of an advancing position, a neutral position and a retreating position. The control unit 41 generates a shift instruction IST based on the shift sensor output SHT and supplies the shift instruction IST to the driver unit 32. To be more specific, when the gear shift lever selects the advancing position, the second power converter 31 controls the drive motor 33 in a normal rotation state, while when the gear shift lever selects the retreating position, the second power converter 31 controls the drive motor 33 in a reverse rotation state. When the gear shift lever selects the neutral position, all semiconductor switches of the second power converter 31 are turned off and hence, the first power converter 25 and the energy storage device 27 are disconnected from the drive motor 33.

The vehicle speed sensor 43D detects a vehicle speed of the hybrid vehicle 10 and outputs a vehicle speed sensor output SPD. The charge sensor 45 is connected to the energy storage device 27 and detects a terminal voltage V of the energy storage device 27 and a charge/discharge current I of the energy storage device 27, calculates a charge rate CR of the energy storage device 27 based on the terminal voltage V and the charge/discharge current I, and outputs the charge rate CR. The vehicle inclination sensor 47 detects the inclination of the hybrid vehicle 10 in the running direction with respect to a horizontal surface, and outputs an inclination sensor output INC.

The driving operation state of the hybrid vehicle 10, particularly, starting or acceleration of the vehicle requires large power for driving the drive motor 33. Here, by additionally supplying the charge output PB to the generation output PG, it is possible to drive the engine 21 in a driving state with favorable fuel economy and with a least exhaust gas. A depth of the charge rate of the energy storage device 27 influences a life time of the energy storage device 27 and hence, the charge rate of the energy storage device 27 is controlled between an upper limit and a lower limit.

When the hybrid vehicle 10 ascends a slope, in the same manner as the starting or the acceleration of the vehicle, the charge output PB is utilized for driving the drive motor 33 and hence, the charge rate of the energy storage device 27 is lowered. When the charge rate CR of the energy storage device 27 is lowered to the lower limit, the generation output PG is generated or the generation output PG is increased so as to enhance the charging of the energy storage device 27 with the generation output PG. Further, when the hybrid vehicle 10 descends the slope, the vehicle assumes a coasting state, and the regeneration output PM of the drive motor 33 is collected by the energy storage device 27 and hence, the charge rate CR of the energy storage device 27 is elevated. When the charge rate CR of the energy storage device 27 is increased to the upper limit, the generation output PG is stopped or the generation output PG is lowered thus suppressing the charging of the energy storage device 27.

The control unit 41, according to the embodiment 1, incorporates a generation control circuit 50 which generates a generation ON/OFF instruction IPGonoff therein, and executes a charge rate control target value setting program 70 which sets a generation start charge rate target value CRTon and a generation stop charge rate target value CRToff. The generation control circuit 50 is shown in FIG. 2 and the charge rate control target value setting program 70 is shown in FIG. 3.

The generation ON/OFF instruction IPGonoff is supplied to the engine control unit 22 so as to control driving and stopping of the engine 21 in a repeating method. The engine control unit 22 performs driving and stopping of the engine 21 based on the generation ON/OFF instruction IPGonoff. For example, by turning on an ignition circuit of the engine 21 and driving a starter motor, the engine 21 is driven, while by turning off the ignition circuit of the engine 21, the engine 21 is stopped.

Figure 2:
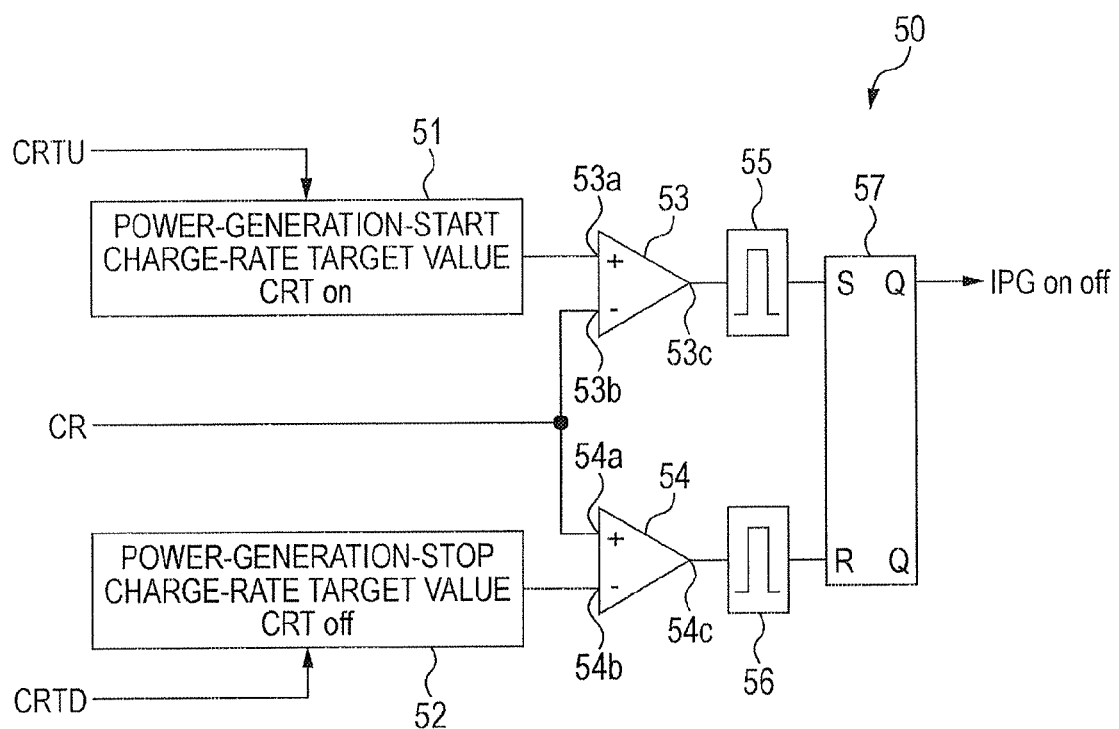
FIG. 2 is an electric circuit diagram showing a generation control circuit in the embodiment 1.
Figure 3:
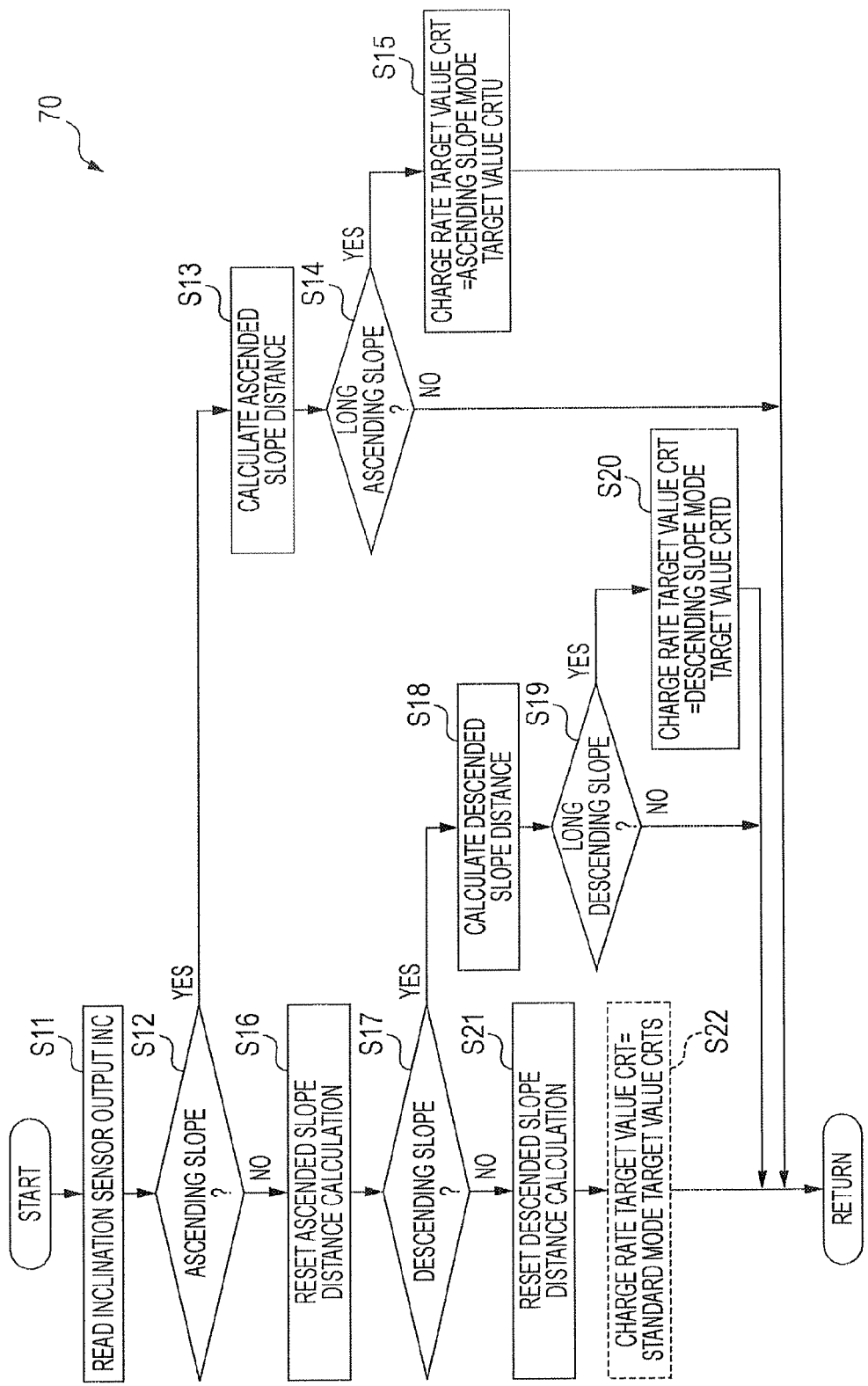
FIG. 3 is a flowchart showing a charge rate control target value setting program in the embodiment 1.

As shown in FIG. 2, the generation control circuit 50 includes setting circuits 51, 52, comparators 53, 54, single pulse generators 55, 56, and a set/reset flip-flop circuit 57. The charge rate control target value CRT, to be more specific, the generation start charge rate target value CRTon corresponding to the lower limit of the charge rate CR is set in the setting circuit 51, and the setting circuit 51 outputs the generation start charge rate target value CRTon. The charge rate control target value CRT, to be more specific, the generation stop charge rate target value CRToff corresponding to the upper limit of the charge rate CR is set in the setting circuit 52, and the setting circuit 52 outputs the generation stop charge rate target value CRToff. The comparator 53 includes a first input 53a, a second input 53b and an output 53c, while the comparator 54 includes a first input 54a, a second input 54b and an output 54c. To the first input 53a of the comparator 53, the generation start charge rate target value CRTon is supplied from the setting circuit 51, while to the second input 53b of the comparator 53, the charge rate CR is supplied from the charge sensor 45. The comparator 53 exhibits the output 53c of high level when the charge rate CR is lowered and arrives at the generation start charge rate target value CRTon. To the first input 54a of the comparator 54, the charge rate CR from the charge sensor 45 is supplied, while to the second input 54b of the comparator 54, the generation stop charge rate target value CRToff is supplied from the setting circuit 52. The comparator 54 exhibits the output 54c of high level when the charge rate CR is elevated and arrives at the generation stop charge rate target value CRToff.

The single pulse generator 55 is connected to the output 53c of the comparator 53, and when the output 53c of the comparator 53 assumes a high level, a single output pulse is generated. The single pulse generator 56 is connected to the output 54c of the comparator 54, and when the output 54c of the comparator 54 assumes a high level, a single output pulse is generated. The set/reset flip-flop 57 includes a set input S, a reset input R and output Q. The set input S is connected to the single pulse generator 55, and when the set input S receives the output pulse from the single pulse generator 55, the set/reset flip-flop 57 is set, and the output Q assumes a high level. The reset input R is connected to the single pulse generator 56, and upon receiving an output pulse from the single pulse generator 56, resets a set/reset flip-flop 57 thus setting the output Q at a low level.

In the generation control circuit 50 shown in FIG. 2, when the charge rate CR from the charge sensor 45 is lowered to the generation start charge rate target value CRTon corresponding to the lower limit, the set/reset flip-flop 57 is set such that the output Q assumes a high level and hence the engine 21 is driven and the respective semiconductor switches of the first power converter 25 are controlled to an ON state. In this ON state, the generator 23 is driven by the engine 21 and hence, the generation output PG is supplied to the energy storage device 27 and the second power converter 31, and the energy storage device 27 is charged with the generation output PG. The state that the set/reset flip-flop 57 is set is continued until the set/reset flip-flop 57 is reset next time, and the charging of the energy storage device 27 with the generation output PG is continuously performed.

When the charge rate CR is elevated to the generation stop charge rate target value CRToff corresponding to the upper limit, the set/reset flip-flop 57 is reset such that the output Q assumes the low level and hence, the engine 21 is stopped and the respective semiconductor switches of the first power converter 25 assume an OFF state. In such a state, the generation output PG becomes zero and hence, the charging of the energy storage device 27 with the generation output PG is stopped. The state that the set/reset flip-flop 57 is reset is continued until the set/reset flip-flop 57 is set next time.

The vehicle inclination sensor 47 detects the inclination of the hybrid vehicle 10 in the running direction with respect to the horizontal surface and outputs the inclination sensor output INC. The control unit 41 executes the charge rate control target value setting program 70 shown in FIG. 3 based on the inclination sensor output INC.

FIG. 3 is a flow chart showing the charge rate control value target setting program 70 executed by the control unit 41. The flow chart shown in FIG. 3 includes twelve steps S11 to S22 between the start and the return of the program 70.

In step S11 which follows the start, the inclination sensor output INC of the vehicle inclination sensor 47 is read. In next step S12, it is determined whether the hybrid vehicle 10 is ascending a slope or not based on the inclination sensor output INC. If a result of the determination in step S12 is affirmative, the processing advances to step S13 and the calculation of the slope ascending distance Lup is executed in step S13. The slope ascending distance Lup is calculated as a product of a time during which the result of the determination in step S12 is held affirmative and the vehicle speed SPD obtained by the vehicle speed sensor 43D. In step S14 which follows step S13, it is determined whether the slope is a long ascending slope or not based on the slope ascending distance Lup. If the slope ascending distance Lup is equal to or more than a predetermined value, a result of the determination in step S14 is affirmative and the processing advances to next step S15. In step S15, a slope ascending mode target value CRTU is set as the generation start charge rate target value CRTon of the setting circuit 51 and, thereafter, the processing advances to the return. Here, if the result of the determination in step S14 is negative, the processing advances to the return.

If a result of the determination in step S12 is negative, the processing advances to next step S16. In this step S16, the slope ascending distance Lup calculated in step S13 is set to zero. In next step S17, it is determined whether the hybrid vehicle 10 is descending the slope or not. The determination of this step S17 is performed based on the inclination sensor output INC read in step S11. If a result of the determination in step S17 is affirmative, the processing advances to step S18, and the calculation of a slope descending distance Ldw is executed in step S18. The slope descending distance Ldw is calculated as a product of a time during which the result of the determination in step S17 is held affirmative and the vehicle speed SPD obtained by the vehicle speed sensor 43D. In step S19 which follows step S18, it is determined whether the slope is a long descending slope or not based on the slope descending distance Ldw. If the slope descending distance Ldw is equal to or more than a predetermined value, a result of the determination in step S19 is affirmative and the processing advances to next step S20. In step S20, a slope descending mode target value CRTD is set as the generation stop charge rate target value CRToff of the setting circuit 52 and, thereafter, the processing advances to the return. Here, if the result of the determination in step S19 is negative, the processing advances to the return.

If a result of the determination in step S1.7 is negative, the processing advances to step S21. In this step S21, the slope descending distance Ldw calculated in step S18 is set to zero. In step S22, a standard mode target value CRTS is set. The standard mode target value SRTS includes two standard mode target values CRTS1, CRTS2 in this embodiment 1. The standard mode target value CRTS1 is set as a generation start charge rate target value CRTon in the setting circuit 51, while the standard mode target value SRTS2 is set as the generation stop charge rate target value CRToff in the setting circuit 52. The relationship CRTS1<CRTS2 is established between the standard mode target values CRTS1, CRTS2.

The relationship CRTU<CRTS1 is established between the slope ascending mode target value CRTU and the standard mode target value CRTS1 and hence, the slope ascending mode target value CRTU is smaller than the standard mode target value CRTS1. The relationship CRTD>CRTS2 is established between the slope descending mode target value CRTD and the standard mode target value CRTS2 and hence, the slope descending mode target value CRTD is larger than the standard mode target value CRTS2. When the hybrid vehicle 10 assumes a standard state other than the slope ascending state and the slope descending state, the standard mode target value CRTS1 is set in the setting circuit 51, while when the slope ascending mode target value CRTU is generated, the slope ascending mode target value CRTU is set in the setting circuit 51 in place of the standard mode target value CRTS1. The standard mode target value CRTS is set in the setting circuit 52 in the standard state, and when the slope descending mode target value CRTD is generated, the slope descending mode target value CRTD is set in the setting circuit 52 in place of the standard mode target value CRTS.

Figure 4:
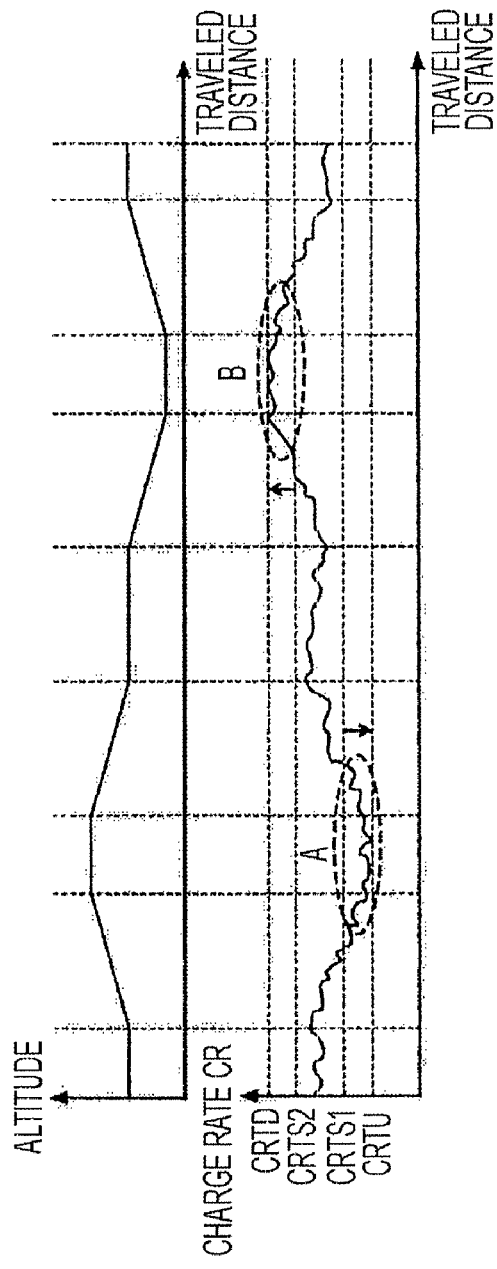
FIG. 4 is a characteristic chart showing a charge rate control characteristic according to the embodiment 1.

FIG. 4 shows a control state of the charge rate obtained by the generation control circuit 50. FIG. 4(a) shows a change of a height of a traveling route of the hybrid vehicle 10, wherein the height of the traveling route is taken on an axis of ordinates and a traveled distance is taken on an axis of abscissas. FIG. 4(b) shows a change of the charge rate CR of the energy storage device 27 corresponding to the change of the height of the traveling route of the hybrid vehicle 10 shown in FIG. 4(a), wherein the charge rate CR is take on an axis of ordinates and the traveled distance is taken on an axis of abscissas.

The generation control circuit 50, when the hybrid vehicle 10 assumes the standard state other than the slope ascending state and the slope descending state, drives the engine 21 when the charge rate CR shown in FIG. 4(b) is lowered and arrives at the standard mode target value CRTS1, and starts charging of the energy storage device 27 with the generation output PG. Further, when the charge rate CR is elevated and arrives at the standard mode target value CRTS2, the generation control circuit 50 stops the engine 21 and stops charging of the energy storage device 27 with the generation output PG.

When the hybrid vehicle 10 assumes a state in which the hybrid vehicle 10 ascends a long upward slope and, as in the case of step S15 in FIG. 3, the slope ascending mode target value CRTU is set in the setting circuit 51 in place of the standard mode target value CRTS1, the generation start charge rate target value CRTon is lowered to the slope ascending mode target value CRTU. As a result, in a region A shown in FIG. 4(b), a level at which the engine 21 is driven is lowered and hence, the driving of the engine 21 is delayed thus obviating the consumption of the energy of the engine 21, enhancing the fuel economy of the engine 21, and improving the discharge of an exhaust gas from the engine 21. Further, when the hybrid vehicle 10 assumes a state in which the hybrid vehicle 10 descends a long downward slope and, as in the case of step S20 in FIG. 3, the slope descending mode target value CRTD is set in the setting circuit 52 in place of the standard mode target value CRTS2, the generation stop charge rate target value CRToff is increased up to the slope descending mode target value CRTD. As a result, in a region B shown in FIG. 4(b), a level at which the engine 21 is stopped is elevated and hence, the stopping of the engine 21 is delayed thus increasing the recovery efficiency of the energy from the engine 21.

In the embodiment 1, the slope ascending state and the slope descending state of the hybrid vehicle 10 are determined based on the vehicle inclination sensor 47, and the charge rate control target value CRT to the energy storage device 27 is set corresponding to the slope ascending state and the slope descending state. Since the embodiment 1 does not utilize GPS radio waves in this manner, even when the hybrid vehicle 10 travels at a place such as tunnel where the GPS radio waves cannot be received, it is possible to surely set the slope ascending mode target value CRTU and the slope descending mode target value CRTD with respect to the energy storage device 27.

Here, it may be possible to use only two values consisting of the slope ascending mode target value CRTU and the slope descending mode target value CRTD without using the standard mode target values CRTS1, CRTS2. In this case, step S22 shown in FIG. 3 is omitted. Here, the standard mode target values CRTS1, CRTS2 are not set, and when the slope ascending mode target value CRTU is set in step S15 shown in FIG. 3, along with the lowering of the charge rate CRT to the slope ascending mode target value CRTU, the engine 21 is driven and the generation output PG is outputted, while when the slope descending mode target value CRTD is set in step S20 shown in FIG. 3, the engine 21 is stopped and the generation output PG becomes zero.

Embodiment 2

In the embodiment 1, the generation control circuit 50 which controls the engine 21 by a system which repeats driving and stopping is incorporated in the control unit 41 and the control unit 41 executes the charge rate control target value setting program 70. However, in the embodiment 2, the engine 21 is continuously driven during driving of the hybrid vehicle 10, and the generation control circuit 50 in the embodiment 1 is replaced with a generation control circuit 60 of a follow-up-control-system. Other parts are constituted in the same manner as the corresponding parts of the embodiment 1, and the control unit 41 executes the charge rate control target value setting program 70 shown in FIG. 3 based on an inclination sensor output INC of the vehicle inclination sensor 47 and decides a charge rate control target value CRT.

Figure 5:
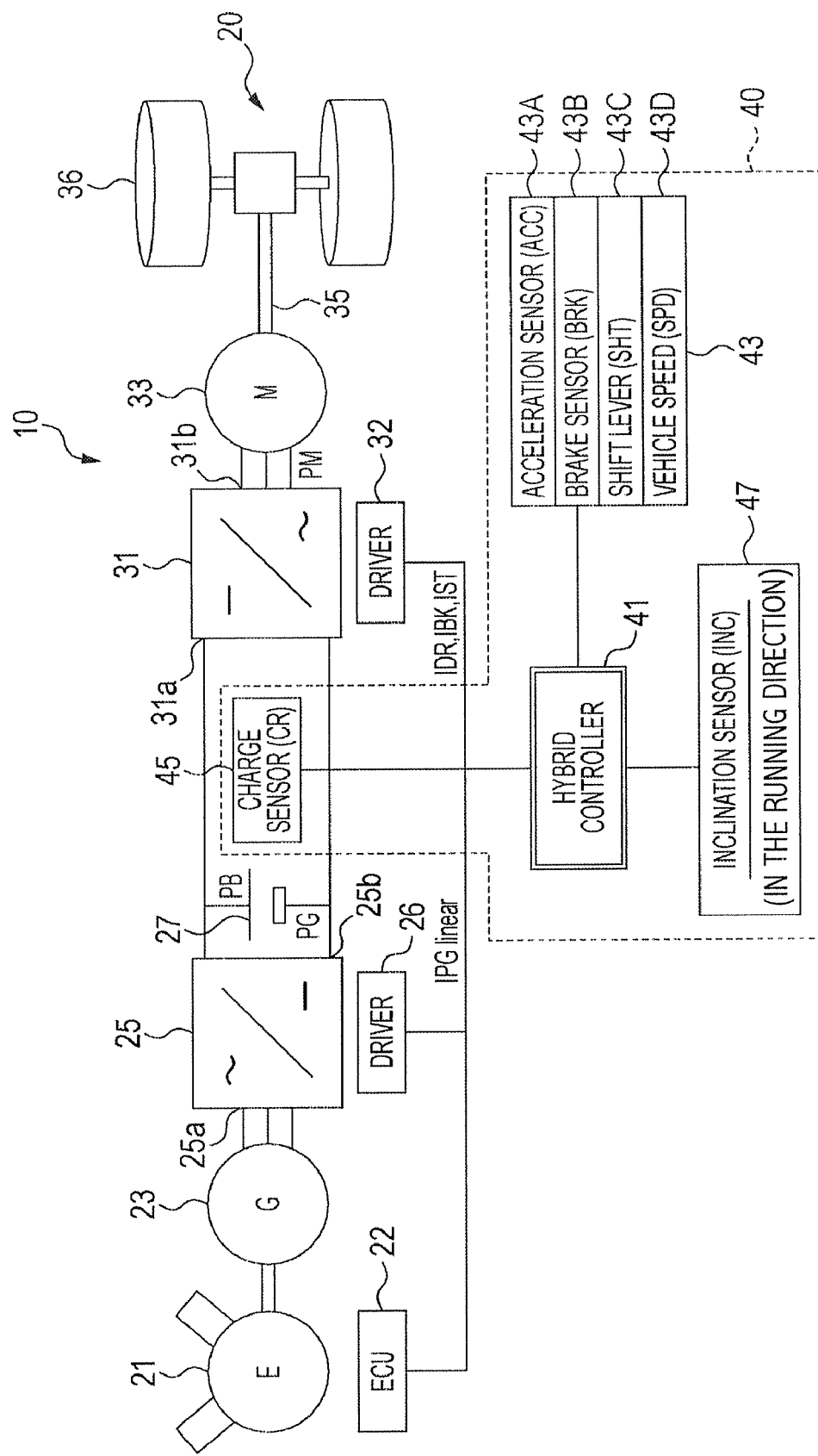
FIG. 5 is a constitutional view showing an embodiment 2 of the hybrid vehicle according to the present invention.

FIG. 5 is a constitutional view showing the embodiment 2 of the hybrid vehicle according to the present invention. In the embodiment 2, the engine 21 is continuously driven at a predetermined rotational speed by a control unit 41 during driving of the hybrid vehicle 10. The predetermined rotational speed of the engine 21 is set to a rotational speed which allows the engine 21 to be operated at high efficiency and can reduce a toxic gas in an exhaust gas.

The generation control circuit 60 of a follow-up-control-system generates a generation power instruction IPGlinear which linearly controls a generation output PG, and supplies the generation power instruction IPGlinear to the driver unit 26 thus allowing the driver unit 26 to perform a PWM control of the first power converter 25 so as to linearly control the generation output PG. The driver unit 26 continuously controls ON periods of the respective semiconductor switches of the first power converter 25 thus linearly controlling the generation output PG.

FIG. 6 shows the generation control circuit 60 of a follow-up-control-system. The generation control circuit 60 includes, as shown in FIG. 6, a limiter 61, a subtracter 62, an amplifier 63 and an adder 64. The limiter 61 includes an input 61a and an output 61b, and the charge rate control target value CRT is given to the input 61a. The charge rate control target value CRT is determined by allowing the control unit 41 to execute the charge rate control target value setting program 70 shown in FIG. 3.

The charge rate control target value CRT is given to the input 61a of the limiter 61. The limiter 61 outputs the charge rate control target value CRT while limiting the charge rate control target value CRT to a value which falls between an upper limit value and a lower limit value of the limiter 61. To the subtracter 62, the charge rate control target value CRT from the limiter 61 and the charge rate CR from the charging sensor 45 are inputted, and the subtracter 62 outputs a subtraction output which is obtained by subtracting the charge rate CR from the charge rate control target value CRT.

The amplifier 63 amplifies the subtraction output from the subtracter 62 and outputs a charge power instruction ICH. To the adder 64, the charge power instruction ICH from the amplifier 63 and a power enhancing instruction IPW are inputted. The power enhancing instruction IPW corresponds to a driving instruction IDR which is supplied to the driver unit 32. The adder 64 outputs the generation power instruction IPGlinear which is obtained by adding the charge power instruction ICH and the power enhancing instruction IPW. The generation power instruction IPGlinear is supplied to the driver unit 26 of the first power converter 25. The first power converter 25 adjusts ON periods of the respective semiconductor switches based on the generation power instruction IPGlinear and outputs the generation output PG corresponding to the generation power instruction IPGlinear.

The charge rate control target value CRT is, also in the embodiment 2, set by allowing the control unit 41 to execute the charge rate control target value setting program 70 shown in FIG. 3. In the charge rate control target value setting program 70, based on the vehicle inclination sensor output INC from the inclination sensor 47, the charge rate control target value CRT is determined. When the hybrid vehicle 10 assumes a standard state other than a slope ascending state and a slope descending state, according to step S22 in FIG. 3, a standard mode target value CRTS is set as the charge rate control target value CRT. In the embodiment 2, the standard mode target value CRTS is set to follow an average change of the charge rate CR from the charging sensor 45.

FIG. 7 shows a control state of the charge rate obtained by the generation control circuit 60. FIG. 7(a) shows a change of a height of a traveling route of the hybrid vehicle 10, wherein the height of the traveling route is taken on an axis of ordinates and a traveled distance is taken on an axis of abscissas. FIG. 7(b) shows a change of the charge rate CR of the energy storage device 27 corresponding to the change of the height of the traveling route of the hybrid vehicle 10 shown in FIG. 7(a), wherein the charge rate CR is taken on an axis of ordinates and a traveled distance is taken on an axis of abscissas. When the standard mode target value CRTS is set as the charge rate control target value CRT, the standard mode target value CRTS is set to follow an average change of the charge rate CR from the charging sensor 45, and the charge rate CR is changed along the standard mode target value CRTS.

When the hybrid vehicle 10 assumes a state in which the hybrid vehicle 10 ascends a long upward slope and, according to step S15 in FIG. 3, a slope ascending mode target value CRTU is set in place of the standard mode target value CRTS, the charge rate control target value CRT is lowered to the slope ascending mode target value CRTU. Further, when the hybrid vehicle 10 assumes a state in which the hybrid vehicle 10 descends a long downward slope and, according to step S20 in FIG. 3, a slope descending mode target value CRTD is set in place of the standard mode target value CRTS, the charge rate control target value CRT is elevated to the slope descending mode target value CRTD.

As a result, in a region A shown in FIG. 7(b), the generation output PG is lowered and hence, a load of the engine 21 is reduced thus obviating the energy consumption of the engine 21. Further, in a region B shown in FIG. 7(b), the generation output PG is increased and hence, the recovery efficiency of the energy from the engine 21 can be enhanced.

Also in the embodiment 2, in the same manner as the embodiment 1, the slope ascending state and the slope descending state of the hybrid vehicle 10 are determined based on the vehicle inclination sensor 47, and the charge rate control target value CRT with respect to the energy storage device is set corresponding to the slope ascending state and the slope descending state. Since the embodiment 2 does not utilize GPS radio wave in this manner, even when the hybrid vehicle 10 travels at a place such as a tunnel where the GPS radio waves cannot be received, it is possible to surely set the slope ascending mode target value CRTU and the slope descending mode target value CRTD with respect to the energy storage device 27.

Here, also in the embodiment 2, in a flow chart of the charge rate control target value setting program 70 shown in FIG. 3, step S22 may be omitted. In this case, the setting of the standard mode target value CRTS is not performed, and when the hybrid vehicle 10 assumes the slope ascending state and the slope descending state, the generation control circuit 60 sets the slope ascending mode target value CRTU and the slope descending mode target value CRTD and performs a control of the charge rate CR.

Embodiment 3

Figure 8:
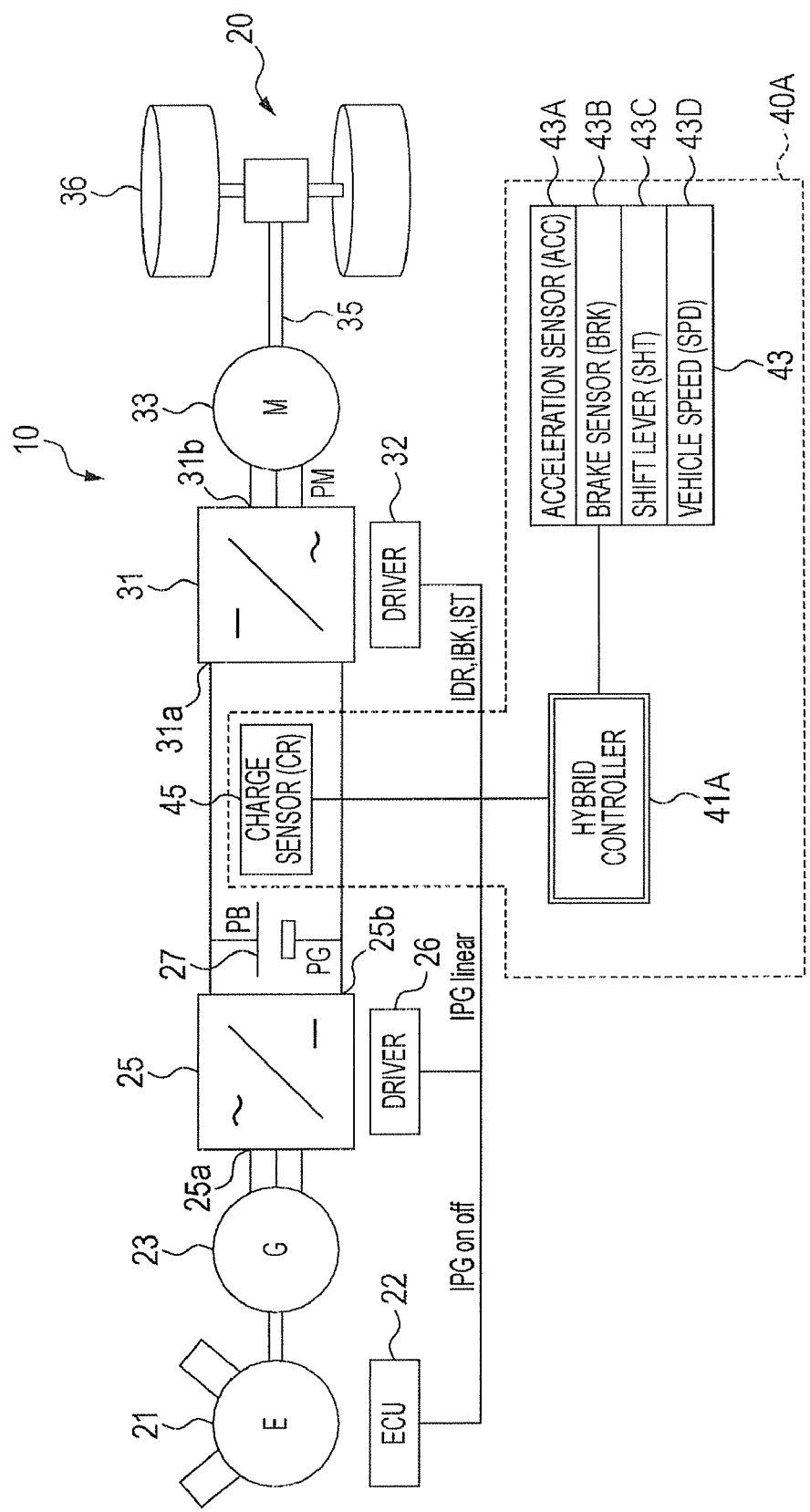
FIG. 8 is a constitutional view showing an embodiment 3 of the hybrid vehicle according to the present invention.

FIG. 8 is a constitutional view showing an embodiment 3 of the hybrid vehicle according to the present invention. The hybrid vehicle 10 of the embodiment 3 includes a driving system 20 and a control system 40A. The driving system 20 is equal to the driving system 20 of the embodiment 1 or 2. The control system 40A includes a control unit 41A, a vehicle drive sensor 43 and a charge sensor 45. In this control system 40A, a vehicle inclination sensor 47 in the embodiment 1 or 2 is eliminated. The vehicle drive sensor 43 and the charge sensor 45 are equal to the vehicle drive sensor 43 and the charge sensor 45 in the embodiment 1 or 2.

The control unit 41A is a hybrid controller. This control unit 41A incorporates either one of a generation control circuits 50 of the embodiment 1 shown in FIG. 2 and a generation control circuit 60 of the embodiment 2 shown in FIG. 6, and executes a charge rate control target value setting program 70A shown in FIG. 9. The charge rate control target value setting program 70A sets a charge rate control target value CRT based on a drive sensor output from the vehicle drive sensor 43 without using the inclination sensor output INC from the vehicle inclination sensor 47 in the embodiment 1 or 2. Here, in FIG. 8, although both a power generation ON/OFF control instruction IPGonoff from a generation control circuit 50 to an engine control unit 22 and a generation power instruction IPGlinear from a generation control circuit 60 to a driver unit 26, either one of the instructions is used.

Figure 9:
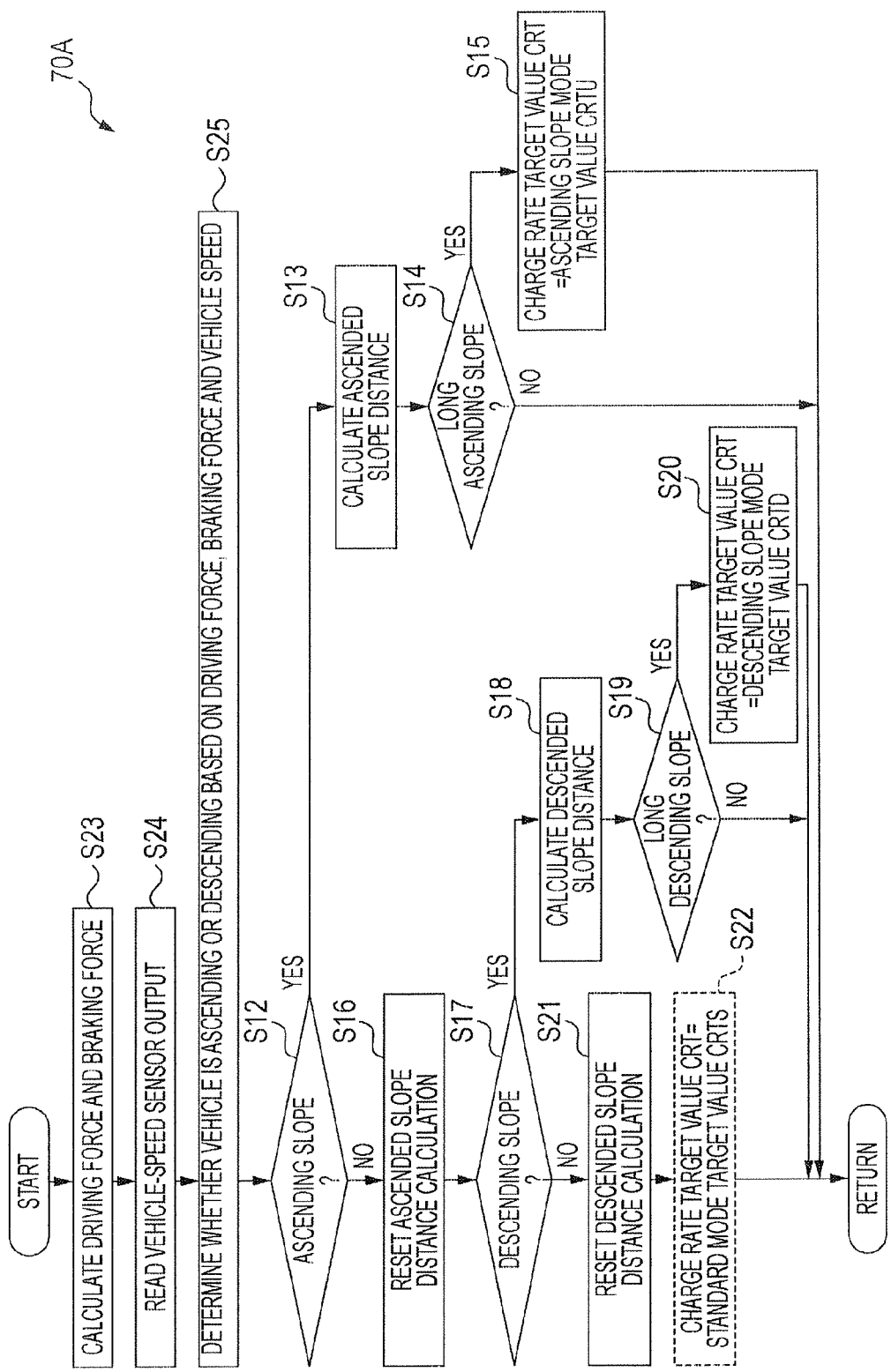
FIG. 9 is a flowchart showing a charge rate control target value setting program in the embodiment 3.

The charge rate control target value setting program 70A shown in FIG. 9 is a program which is obtained by deleting step S11 from the charge rate control target value setting program 70 of the embodiment 1 or 2 shown in FIG. 3 and by adding three steps of S23, S24 and S25 to the charge rate control target value setting program 70. These steps S23, S24 and S25 are added between a start step and step S12. Steps from steps S12 to S22 are equal to corresponding steps in the charge rate control target value setting program 70 of the embodiment 1 or 2.

In step S23, a driving force and a braking force of the hybrid vehicle 10 are calculated. In this step S23, an acceleration sensor output ACC from an acceleration sensor 43A of the vehicle drive sensor 43 and a brake sensor output BRK from a brake sensor 43B are utilized. The driving force FDR of the hybrid vehicle 10 is calculated based on the acceleration sensor output ACC, and the braking force FBK of the hybrid vehicle 10 is calculated based on the brake sensor output BRK. The driving force FDR of the hybrid vehicle 10 is, in the driving operational state of the hybrid vehicle 10, a driving force which is generated by a drive motor 33 based on a driving instruction IDR and, for example, is calculated by multiplying the acceleration sensor output ACC by a constant. The braking force FBK of the hybrid vehicle 10 is a braking force which is given to the drive motor 33 based on a braking instruction IBK and, for example, is calculated by multiplying the brake sensor output BRK by a constant.

In step S24 which follows step S23, the vehicle speed sensor output SPD of the vehicle drive sensor 43 is read. In step S25 which follows step S24, it is determined whether the hybrid vehicle 10 is in the slope ascending state or in the slope descending state based on the driving force FDR and the braking force FBK calculated in step S23 and the vehicle speed sensor output SPD read in step S24. First of all, a change of the driving force FDR and a change of the vehicle speed sensor output SPD are compared with each other, and if the vehicle speed sensor output SPD is not increased in spite of the increase of the driving force FDR, it is determined that the hybrid vehicle 10 assumes the slope ascending state. Next, a change of the braking force FBK and the change of the vehicle speed sensor output SPD are compared with each other and if the vehicle speed sensor output SPD is not decreased in spite of the increase of the braking force FBK, it is determined that the hybrid vehicle 10 assumes the slope descending state. Step S12 and steps succeeding step S12 are substantially equal to corresponding steps in the embodiment 1 or 2, wherein the slope ascending mode target value CRTIJ is set in step S15, and the slope descending mode target value CRTD is set in step S20.

In this embodiment 3, the control unit 41A determines the slope ascending state and the slope descending state of the hybrid vehicle 10 based on the drive sensor output of the vehicle drive sensor 43, and sets the charge rate control target value CRT with respect to the energy storage device corresponding to the slope ascending state or the slope descending state. Since the embodiment 3 does not utilize GPS radio waves in this manner, even when the hybrid vehicle 10 travels at a place such as a tunnel where the GPS radio waves cannot be received, it is possible to surely set the slope ascending mode target value CRTU and the slope descending mode target value CRTD with respect to the energy storage device 27.

Embodiment 4

Figure 10:
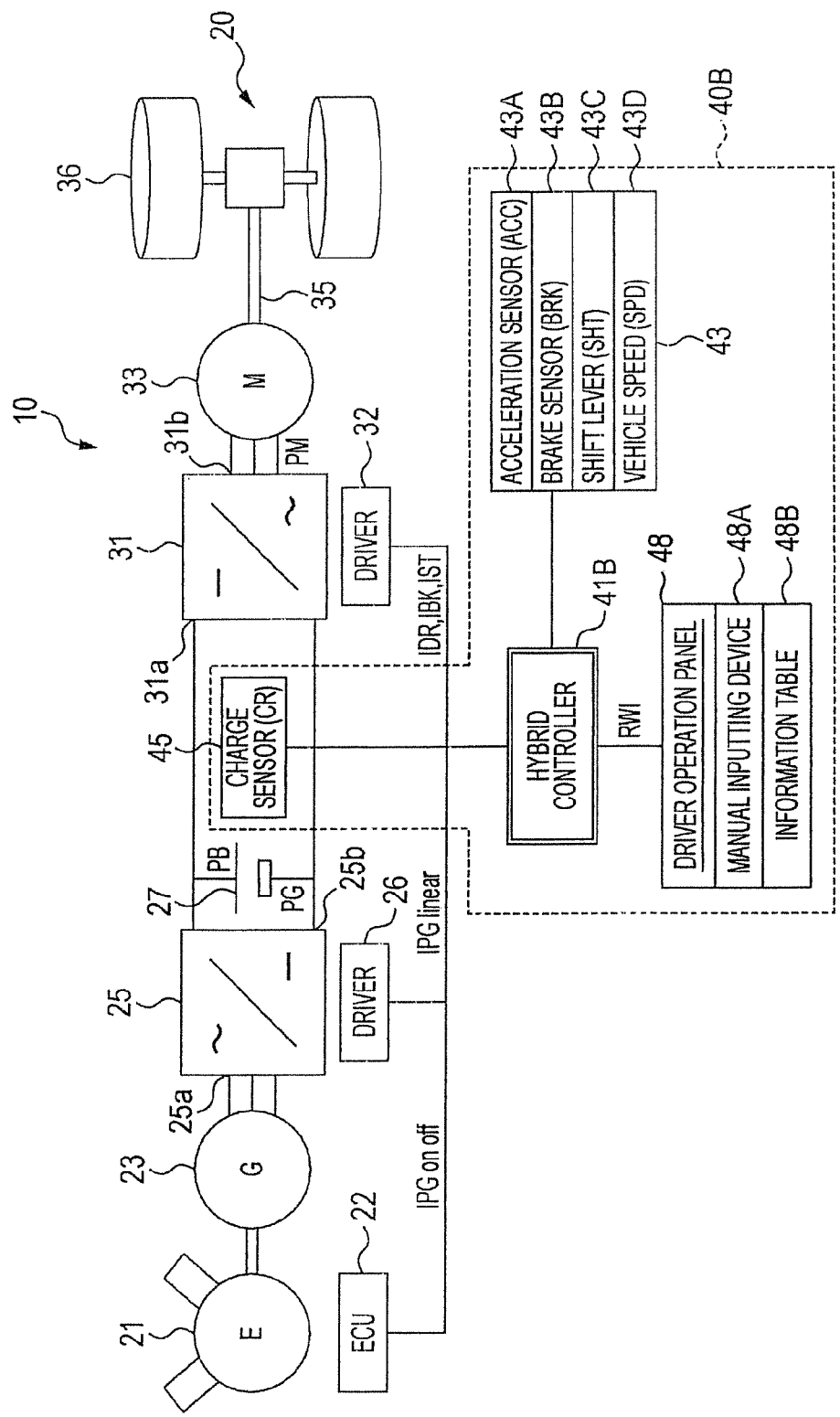
FIG. 10 is a constitutional view showing an embodiment 4 of the hybrid vehicle according to the present invention.

FIG. 10 is a constitutional view of an embodiment 4 of a hybrid vehicle according to the present invention. The hybrid vehicle 10 according to the embodiment 4 includes a driving system 20 and a control system 40B. The driving system 20 is equal to the driving system 20 according to the embodiment 1 or the embodiment 2. The control system 40B includes a control unit 41B, a vehicle drive sensor 43, a charge sensor 45 and a driver operation panel 48. The control system 40B of this embodiment 4 also eliminates the vehicle inclination sensor 47 used in the embodiment 1 or in the embodiment 2. The vehicle drive sensor 43 and the charge sensor 45 according to this embodiment are equal to the vehicle drive sensor 43 and the charge sensor 45 of the embodiment 1 or the embodiment 2.

Figure 11:
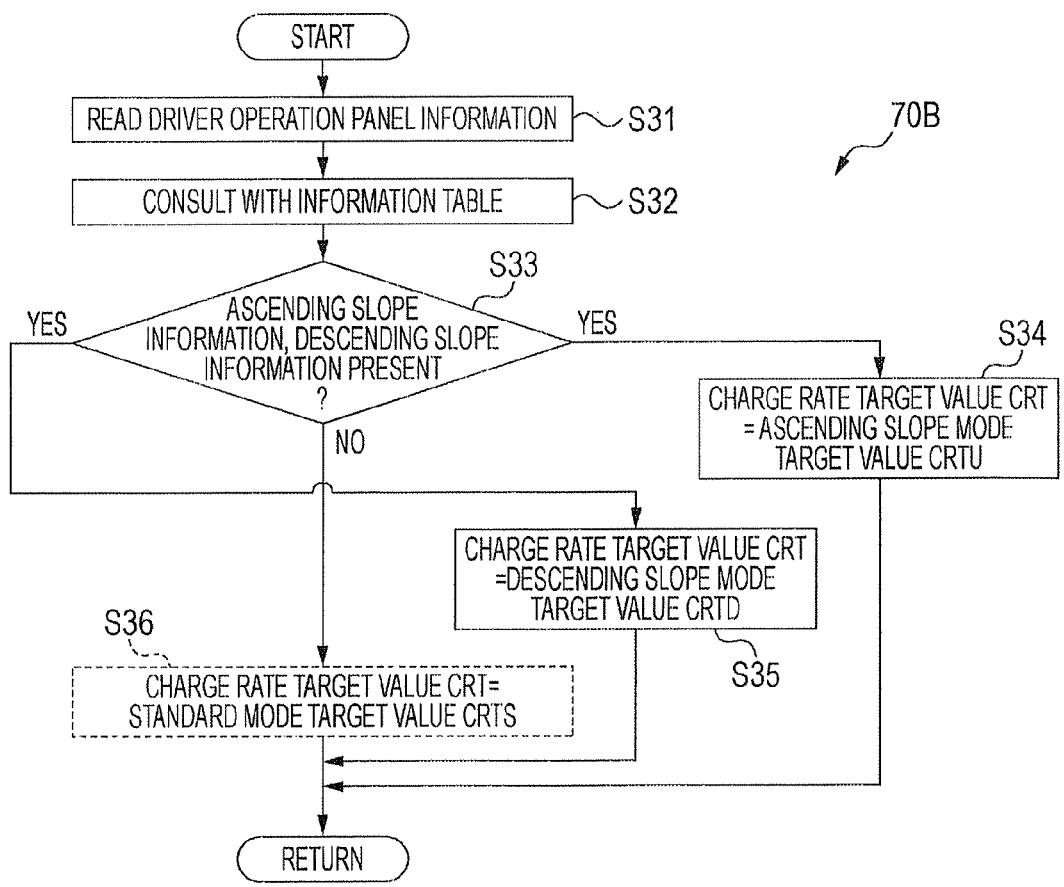
FIG. 11 is a flow chart showing a charge rate control target value setting program in the embodiment 4.

The control unit 41B is a hybrid sensor, and this control unit 41B incorporates either one of the generation control circuit 50 according to the embodiment 1 shown in FIG. 2 and the generation control circuit 60 according to the embodiment 2 shown in FIG. 6 therein and executes a charge rate control target value setting program 70B shown in FIG. 11 in the traveling route of the hybrid vehicle 10. The charge rate control target value setting program 70B sets a charge rate control target value CRT in the traveling route of the hybrid vehicle 10 using the driver operation panel 48 without using the inclination sensor output INC of the vehicle inclination sensor 47 according to the embodiment 1 or the embodiment 2. Here, although both the power generation ON/OFF control instruction IPGonoff from the generation control circuit 50 to the engine control unit 22 and the generation power instruction IPGlinear from the generation control circuit 60 to the driver unit 26 are shown in FIG. 10, either one of the power generation ON/OFF control instruction IPGonoff and the generation power instruction IPGlinear is used.

The driver operation panel 48 includes a manual inputting device 48A and an information storage device 48B. The driver operation panel 48 is manually operated by a driver of the hybrid vehicle 10. The manual inputting device 48A is, for example, an input switch, and the driver manually inputs a traveling planed road RW on which the vehicle travels next in the traveling route of the hybrid vehicle 10. The information storage device 48B stores route information including slope ascending information and slope descending information of all routes. Here, when the hybrid vehicle 10 is a route bus which performs a route service, an operation switch which is operated at each bus stop is arranged at a driver's seat. However, the operation switch may be utilized as the manual inputting device 48A.

FIG. 11 shows a charge rate control target value setting program 70B which is used in the embodiment 4, and FIG. 12 and FIG. 13 show control states of the charge rate according to the embodiment 4. FIG. 12 shows a control state of the charge rate when the generation control circuit 50 shown in FIG. 2 is used in the embodiment 4. FIG. 12(a) shows a change of height of the traveling planed road RW of the hybrid vehicle 10, wherein the height of the traveling planed road RW is taken on an axis of ordinates and a traveled distance is taken on an axis of abscissas. FIG. 12(b) is a graph showing a change of charge rate CR of the energy storage device 27 corresponding to FIG. 12(a), wherein the charge rate CR is taken on an axis of ordinates and a traveled distance is taken on an axis of abscissas. FIG. 13 shows, in the embodiment 4, a control state of the charge rate when the generation control circuit 60 shown in FIG. 6 is used. FIG. 13(a) indicates a change of a height of a traveling planed road RW of the hybrid vehicle 10, wherein an axis of ordinates indicates a height of the traveling planed road RW and an axis of abscissas indicates a traveled distance. FIG. 13(b) is a graph showing a change of a charge rate CR of an energy storage device 27 corresponding to FIG. 13(a), wherein the charge rate CR is taken on an axis of ordinates and a traveled distance is taken on an axis of abscissas.

The charge rate control target value setting program 70B shown in FIG. 11 sets, when the traveling planed road RW is inputted by the manual inputting device 48A in the traveling route of the hybrid vehicle 10, a charge rate control target value CRT with respect to the traveling planed road RW. A flow chart of the charge rate control target value setting program 70B shown in FIG. 11 includes seven steps S31 to S37 between a start and a return.

In step S31, the traveling planed road RW which is inputted by the manual inputting device 48A of the driver operation panel 48 is read. In Step S32 which follows step S31, by reference to the information storage device 48B, route information RWI of the traveling planed road RW is read. In step S33 which follows step S32, it is determined whether the slope ascending information and the slope descending information are present in the route information RWI of the traveling planed road RW or not. When the slope ascending information is included in the route information RWI, a result of determination on the right side of step S33 is affirmative, and the processing advances to step S34. In step S34, a slope ascending mode target value CRTU is set to the charge rate control target value CRT and the processing advances to the return. The slope ascending mode target value CRTU is, in the embodiment 4, set to assume the high charge rate CR of the energy storage device 27 to prepare for the slope ascending in the traveling planed road RW. To be more specific, when the generation control circuit 50 shown in FIG. 2 is used, the relationship CRTU>CRTS2 is established and, as shown in FIG. 12(b), the generation stop charge rate target value CRToff is increased to slope ascending mode target value CRTU from standard mode target value CRTS2 and hence, the lowering of generation output PG is prevented and the charge rate CR of the energy storage device 27 is increased. When the generation control circuit 60 shown in FIG. 6 is used, the charge rate control target value CRT shown in FIG. 13(b) is increased and hence, the charge rate CR of the energy storage device 27 is increased.

When the slope descending information is included in the route information RWI of the traveling planed road RW, a result of the determination on the left side of step S33 is affirmative, and the processing advances to Step S35. In Step S35, a slope descending mode target value CRTD is set to the charge rate control target value CRT and the processing advances to the return. The slope descending mode target value CRTD is, in the embodiment 4, set to a value which lowers a charge rate of the energy storage device 27 to prepare for the slope descending in the traveling planed road RW. To be more specific, when the generation control circuit 50 shown in FIG. 2 is used, the relationship CRTD<CRTS1 is established, and, as shown in FIG. 12(b), the generation start charge rate target value CRTon is decreased to slope descending mode target value CRTD from the standard mode target value CRTS1 and hence, the discharge of the energy storage device 27 is enhanced. When the generation control circuit 60 shown in FIG. 6 is used, the charge rate control target value CRT shown in FIG. 13(b) is decreased and hence, the discharge of the energy storage device 27 is enhanced.

When the slope ascending information and the slope descending information are not included in the route information RWI of the traveling planed road RW, a result of the determination of step S33 is negative and the processing advances to step S37. In step S37, in the same manner as step S22 in FIG. 3 and FIG. 9, the standard mode target value CRTS is set as the charge rate control target value CRT, and the processing advances to the return.

In this manner, before the hybrid vehicle 10 travels to the traveling planed road RW in the traveling route of the hybrid vehicle 10, when the slope ascending information is included in the route information RWI of the traveling planed road RW, the slope ascending mode target value CRTU is set preliminarily, while when the slope descending information is included in the route information RWI of the traveling planed road RW, the slope descending mode target value CRTD is set preliminarily thus increasing the charge rate of the energy storage device 27 in a region A in FIG. 12(b) and FIG. 13(b) and decreasing the charge rate of the energy storage device 27 in a region B shown in FIG. 12(b) and FIG. 13(b).

In the embodiment 4, during the driving of the hybrid vehicle 10, the traveling planed road RW is set by utilizing the driver operation panel 48. Here, when the route information RWI of the traveling planed road RW includes the slope ascending information, the slope ascending mode target value CRTU is set, while when the route information RWI of the traveling planed road RW includes the slope descending information, the slope descending mode target value CRTD is set. Further, when the route information RWI of the traveling planed road RW includes neither the slope ascending information nor the slope descending information, the standard mode target value CRTS is set. In the embodiment 4, by utilizing the route information RWI of the traveling planed road RW which is inputted using the driver operation panel 48, the slope ascending information and the slope descending information are confirmed and, corresponding to the slope ascending state or the slope descending state, the charge rate control target value CRT corresponding to the energy storage device is set. Since the GPS radio waves are not utilized, even when the hybrid vehicle 10 travels at a place such as a tunnel where the GPS radio waves cannot be received, it is possible to surely set the slope ascending mode target value CRTU and the slope descending mode target value CRTD with respect to the energy storage device 27.

Further, also in the embodiment 4, within a range of capacity of the energy storage device 27, before the hybrid vehicle 10 advances to the traveling planed road RW, the charge rate control target value is set to prepare for the discharging and charging of the energy storage device 27 and the charge rate is controlled based on the charge rate control target value and hence, compared to the embodiment 1 to the embodiment 3, it is possible to reduce the capacity of the energy storage device 27.

Here, also in the embodiment 4, it is possible to perform the generation control using only the slope ascending mode target value CRTU and the slope descending mode target value CRTD without using the standard mode target value CRTS. In this case, step S36 in FIG. 11 is eliminated, and the charge rate CR is controlled using the slope ascending mode target value CRTU and the slope descending mode target value CRTD.

Embodiment 5

Figure 14:
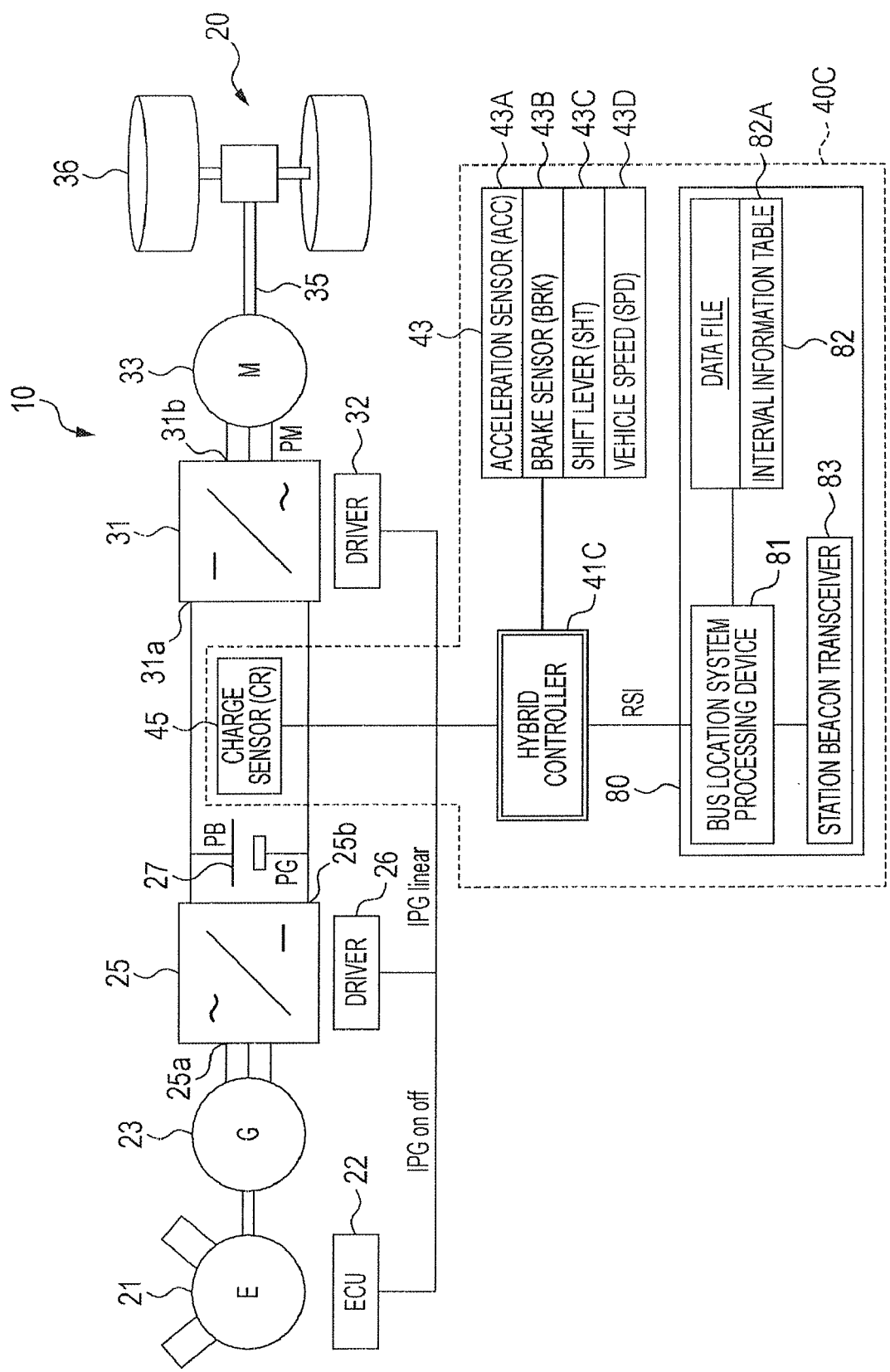
FIG. 14 is a constitutional view showing an embodiment 5 of the hybrid vehicle according to the present invention.

FIG. 14 is a constitutional view of an embodiment 5 of a hybrid vehicle according to the present invention. The hybrid vehicle 10 of the embodiment 5 is constituted as a route bus which performs a route service of a preset traveling route and includes a driving system 20 and a control system 40C. The driving system 20 is equal to the driving system 20 in the embodiment 1 or 2. The control system 40C includes a control unit 41C, a vehicle drive sensor 43, a charge sensor 45, and a bus location system 80. Also in the control system 40B of this embodiment, the vehicle inclination sensor 47 used in the embodiment 1 or 2 is eliminated. The vehicle drive sensor 43 and the charge sensor 45 are equal to the vehicle drive sensor 43 and the charge sensor 45 in the embodiment 1 or 2.

The control unit 41C is a hybrid controller. The control unit 41C incorporates either one of the generation control circuit 50 of the embodiment 1 shown in FIG. 2 or the generation control circuit 60 of the embodiment 2 shown in FIG. 6 therein and executes a charge rate control target value setting program 70C shown in FIG. 15 in the route service operation of the hybrid vehicle 10. The charge rate control target value setting program 70C, without utilizing the inclination sensor output INC of the vehicle inclination sensor 47 in the embodiment 1 or 2, uses the bus location system 80 to set a charge rate control target value CRT during the route service operation of the hybrid vehicle 10. Here, in FIG. 14, although both a power generation ON/OFF control instruction IPGonoff from the generation control circuit 50 to an engine control unit 22 and a generation power instruction IPGlinear from the generation control circuit 60 to the driver unit 26 are shown, either one of the instructions is used.

The bus location system 80 includes a bus location system processing device 81, a route information storage device 82, and a positional information acquisition device 83. With respect to the operation route to which the hybrid vehicle 10 provides the route service, a plurality of beacons is arranged along the operation route. The beacons are referred to as, for example, bus stop beacons and are arranged at the respective bus stops along the operation route. Between the respective bus stop beacons, service intervals are set respectively. The route information storage device 82 is a data file and includes an interval information table 82A. The interval information table 82A stores route information RSI including the slope ascending information and the slope descending information on all the service intervals included in the operation route along which the hybrid vehicle 10 provides the route service. The positional information acquisition device 83 is, for example, a transceiver which performs transmission and reception of signals with the beacons of the bus stops, and the positional information acquisition device 83 performs, in the operation of the hybrid vehicle 10, transmission and reception of signals with the respective bus stop beacons to acquire the positional information on the hybrid vehicle 10. The bus location processing device 81 is connected to the route information storage device 82 and the positional information acquisition device 83 and processes the information of these devices.

Figure 15:
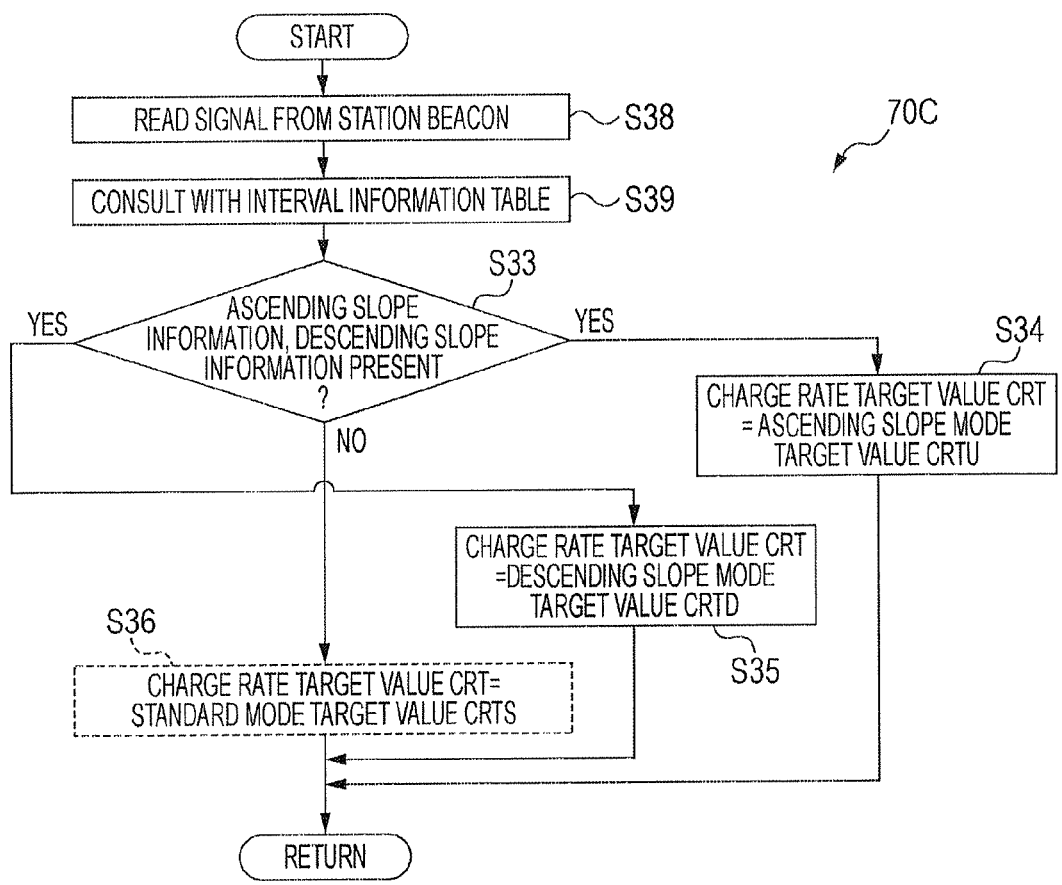
FIG. 15 is a flow chart showing a charge rate control target value setting program in the embodiment 5.

The control unit 41C executes the charge rate control target value setting program 70C shown in FIG. 15 each time the hybrid vehicle 10 stops at each bus stop or each time the hybrid vehicle 10 passes each bus stop, and sets the charge rate control target value CRT for the service interval in which the hybrid vehicle 10 travels next. The flow chart of the charge rate target value setting program 70C shown in FIG. 15 is a flow chart which displaces steps S31, S32 in the flow chart 70B shown in FIG. 11 with steps S38, S39 respectively. Step S33 and steps succeeding step S33 are equal to the steps of the flow chart shown in FIG. 11.

In step S38, in the bus stop at which the hybrid vehicle 10 stops or through which the hybrid vehicle 10 passes, the transaction of the bus stop beacon and the signals is performed thus acquiring the signals from the bus stop beacon and eventually acquiring positional information. In next step S39, by reference to the interval information table 82A, the route information RSI of the service interval which the hybrid vehicle 10 travels next is read. In step S33, it is determined whether the route information RSI includes the slope ascending information and the slope descending information or not. If the route information RSI of the next service interval includes the slope ascending information, the processing advances to step S34. In step S34, in the same manner as step S34 in FIG. 11, the slope ascending mode target value CRTU is set as the charge rate control target value CRT and the processing advances to the return.

If the route information RSI includes the slope descending information, the processing advances to step S35. In step S35, in the same manner as step S35 in FIG. 11, the slope descending mode target value CRTD is set as the charge rate control target value CRT and the processing advances to the return. If the route information RSI includes neither the slope ascending information nor the slope descending information, the processing advances to step S37. In step S37, in the same manner as step S36 in FIG. 11, the standard mode target value CRTS is set as the charge rate control target value CRT and the processing advances to the return.

Also in this embodiment 5, when the generation control circuit 50 shown in FIG. 2 is used, in the same manner as the embodiment 4, the target values CRTU, CRTD, CRTS1 and CRTS2 are set to satisfy the relationships CRTU>CRTS2, CRTD<CRTS1. Further, when the generation control circuit 60 shown in FIG. 6 is used, a control is performed such that the charge rate control target value CRT becomes higher than the slope ascending mode target value CRTU and the charge rate control target value CRT becomes lower than the slope descending mode target value CRTD. Accordingly, if the route information RSI of the service interval in which the hybrid vehicle 10 travels next includes the slope ascending information, a control to increase the charge rate of the energy storage device 27 is performed to prepare for the slope ascending. Further, if the route information RSI of the service interval in which the hybrid vehicle 10 travels next includes the slope descending information, a control to lower the charge rate of the energy storage device 27 is performed to prepare for the slope descending.

In this embodiment 5, the bus location system 80 is utilized during the driving of the hybrid vehicle 10, wherein when the route information RSI of the service interval includes the slope ascending information, the slope ascending mode target value CRTU is set, when the route information RSI includes the slope descending information, the slope descending mode target value CRTD is set, and when the route information includes neither the slope ascending information nor the slope descending information, the standard mode target value CRTS is set. In this embodiment 5, the positional information is acquired from the beacons which are arranged along the traveling route, and the slope ascending information or the slope descending information is confirmed by utilizing the route information RSI of the service interval in which the hybrid vehicle 10 travels next based on the positional information, and the charge rate control target value CRT with respect to the energy storage devices is set corresponding to the slope ascending state or the slope descending state. Since the embodiment 5 does not utilize GPS radio waves in this manner, even when the hybrid vehicle 10 travels at a place such as tunnel where the GPS radio waves cannot be received, it is possible to surely set the slope ascending mode target value CRTU and the slope descending mode target value CRTD with respect to the energy storage device 27.

Here, also in this embodiment 5, it is possible to perform the generation control using only slope ascending mode target value CRTU and the slope descending mode target value CRTD without using the standard mode target value CRTS. In this case, step S36 in FIG. 15 can be deleted.

It should be understood that various modifications or variations of the present invention can be realized by those who are skilled in the art to which the present invention pertains without departing from the gist of the present invention, and the present invention is not limited to the respective embodiments described in this specification.

INDUSTRIAL APPLICABILITY

The hybrid vehicle according to the present invention is utilized as a so-called series-type hybrid vehicle.

The invention claimed is:

1. A hybrid vehicle comprising:
an engine;
a generator which is driven by the engine;
an energy storage device; and
a drive motor which drives the hybrid vehicle, and is configured such that the drive motor drives the hybrid vehicle upon receiving a generation output of the generator and an energy storage output of the energy storage device and, further, the energy storage device is charged with the generation output of the generator and a regeneration output of the drive motor, wherein
the hybrid vehicle includes a control unit which controls the generation output of the generator and controls the charging to the energy storage device, and an inclination sensor which detects an inclination in the running direction of the hybrid vehicle with respect to a horizontal surface, and
the control unit includes
a first determination means which determines a slope ascending state of the hybrid vehicle based on an inclination sensor output of the inclination sensor,
a second determination means which determines a slope descending state of the hybrid vehicle based on the inclination sensor output of the inclination sensor,
a slope ascending distance calculation means which calculates a slope ascending distance when the slope ascending state is determined,
a third determination means which determines a long slope ascending state in which the slope ascending distance is equal or more than a predetermined value,
a slope descending distance calculation means which calculates a slope descending distance when the slope descending state is determined,
a fourth determination means which determines a long slope descending state in which the slope descending distance is equal or more than a predetermined value,
a first setting means sets an ascending mode target value as a charge rate control target to the energy storage device when the long slope ascending state is determined, and
a second setting means sets a descending mode target value as the charge rate control target to the energy storage device when the long slope descending state is determined, and
the control unit controls the generation output of the generator based on the charge rate control target and controls the charging to the energy storage device.

2. The hybrid vehicle according to claim 1, wherein the hybrid vehicle further includes a charge sensor which outputs a charge rate of the energy storage device, and the control unit controls the generation output of the generator based on the charge rate and the charge rate control target.

3. The hybrid vehicle according to claim 2, wherein the control unit controls driving and stopping of the engine and performs an ON/OFF control of the generation output of the generator.

4. The hybrid vehicle according to claim 2, wherein the hybrid vehicle further includes a power converter which controls the generation output of the generator, and the control unit controls the generation output of the generator by controlling the power converter.

* * * * *